United States Patent
Wang et al.

(10) Patent No.: US 12,505,528 B2
(45) Date of Patent: Dec. 23, 2025

(54) SPINNING WORKSHOP INSPECTION METHOD, ELECTRONIC DEVICE AND STORAGE MEDIUM

(71) Applicants: ZHEJIANG HENGYI PETROCHEMICAL CO., LTD., Zhejiang (CN); ZHEJIANG SHUANGTU NEW MATERIALS CO., LTD., Hangzhou (CN)

(72) Inventors: Peng Wang, Hangzhou (CN); Yibo Qiu, Hangzhou (CN); Bin He, Hangzhou (CN); Xiantao Peng, Hangzhou (CN); Dong Jiang, Hangzhou (CN); Chun Feng, Hangzhou (CN)

(73) Assignees: ZHEJIANG HENGYI PETROCHEMICAL CO., LTD., Hangzhou (CN); ZHEJIANG SHUANGTU NEW MATERIALS CO., LTD., Hangzhou (CN)

( * ) Notice: Subject to any disclaimer, the term of this patent is extended or adjusted under 35 U.S.C. 154(b) by 0 days.

(21) Appl. No.: 18/760,751

(22) Filed: Jul. 1, 2024

(65) Prior Publication Data
US 2025/0100159 A1   Mar. 27, 2025

(30) Foreign Application Priority Data
Sep. 26, 2023   (CN) .......................... 202311248643.3

(51) Int. Cl.
*G06T 7/00*   (2017.01)
*B25J 9/16*   (2006.01)
(Continued)

(52) U.S. Cl.
CPC ........... *G06T 7/0004* (2013.01); *B25J 9/1697* (2013.01); *G06V 20/52* (2022.01); *B25J 19/023* (2013.01);
(Continued)

(58) Field of Classification Search
CPC . G06T 2207/30108; G06T 2207/03124; G06T 2207/30196; G06T 2207/30201;
(Continued)

(56) References Cited

U.S. PATENT DOCUMENTS

2015/0228078 A1* 8/2015 Zahand ................... F16P 3/142
382/103
2019/0066488 A1   2/2019 Locke et al.

FOREIGN PATENT DOCUMENTS

CN   113780224 A   12/2021
CN   116311771 A   6/2023
(Continued)

OTHER PUBLICATIONS

Extended European Search Report for corresponding Application No. 24185940.4, dated Feb. 3, 2025, 7 pages.
(Continued)

*Primary Examiner* — Spencer D Patton
(74) *Attorney, Agent, or Firm* — Dority & Manning, PA

(57) ABSTRACT

Provided is a spinning workshop inspection method, an electronic device and a storage medium, relating to technical fields of computers. The spinning workshop inspection method includes: acquiring first image information of an inspection passage when an inspection robot inspects a first position corresponding to the first spinning box in the inspection passage; determining a second spinning box from spinning boxes when the first image information includes a first detection object; acquiring second image information of the inspection passage when the inspection robot inspects a
(Continued)

second position corresponding to the second spinning box in the inspection passage; and determining state information of the first detection object based on the first and second image information.

20 Claims, 4 Drawing Sheets

(51) Int. Cl.
*B25J 19/02* (2006.01)
*G06V 20/52* (2022.01)

(52) U.S. Cl.
CPC ............... *G06T 2207/30108* (2013.01); *G06T 2207/30196* (2013.01)

(58) Field of Classification Search
CPC ........... G06T 7/0004–001; B25J 19/023; B25J 9/1697; B25J 5/00–04; G06V 20/52
See application file for complete search history.

(56) References Cited

FOREIGN PATENT DOCUMENTS

| | | |
|---|---|---|
| JP | 2009181270 A | 8/2009 |
| JP | 7183232 B2 | 4/2022 |
| JP | 2022100816 A | 7/2022 |
| JP | 2022174638 A | 11/2022 |

OTHER PUBLICATIONS

Wong et al., "Home Alone Faint Detection Surveillance System Using Thermal Camera", Second International Conference on Computer Research and Development, 2010, 5 pages.
Yimyam et al., "Development of heat stroke detection system using image processing techniques", International Conference on Cybrnetics and Innovations, 2023, 6 pages.
Japanese Office Action (w/English translation) for corresponding Application No. 2024-106672, dated Jul. 30, 2024, 4 pages.
Japanese Office Action (w/English translation) for corresponding Application No. 2024-106672, dated Aug. 20, 2024, 3 pages.

\* cited by examiner

SPINNING WORKSHOP INSPECTION METHOD, ELECTRONIC DEVICE AND STORAGE MEDIUM

CROSS-REFERENCE TO RELATED APPLICATIONS

The present application claims priority to Chinese Patent Application No. CN202311248643.3, filed with the China National Intellectual Property Administration on Sep. 26, 2023, the disclosure of which is hereby incorporated herein by reference in its entirety.

TECHNICAL FIELD

The disclosure relates to the technical field of computers, especially to the technical fields of automatic control and deep learning, and in particular, to a spinning workshop inspection method and apparatus, an electronic device and a storage medium.

BACKGROUND

At present, fiber raw materials need to be produced and processed in the spinning workshop to form filament fibers. However, the temperature within the spinning workshop is typically high, making it easy for workers to experience physical discomfort such as heat exhaustion and fainting during their operations, thereby posing safety hazards.

SUMMARY

The present disclosure provides a spinning workshop inspection method and apparatus, an electronic device and a storage medium, to reduce the probability of safety problems in operations of workers.

In a first aspect, the present disclosure provides a spinning workshop inspection method, a spinning workshop including a plurality of spinning boxes arranged along a first direction, an inspection passage being provided on one side of the plurality of spinning boxes, and an inspection robot being capable of moving in the inspection passage to sequentially detect working states of the plurality of spinning boxes; the method including:
  acquiring first image information of the inspection passage in a case where the inspection robot inspects a first position corresponding to a first spinning box in the inspection passage, wherein the first spinning box is one of the plurality of spinning boxes, and the first image information is photographed by the inspection robot;
  determining a second spinning box from the plurality of spinning boxes in a case where the first image information includes a first detection object, wherein the second spinning box has a detection sequence behind the first spinning box;
  acquiring second image information of the inspection passage in a case where the inspection robot inspects a second position corresponding to the second spinning box in the inspection passage, wherein the second image information is photographed by the inspection robot and the second image information is an image including a position of the first detection object in the first image information; and
  determining state information of the first detection object based on the first image information and the second image information.

In a second aspect, the present disclosure provides a spinning workshop inspection apparatus, a spinning workshop including a plurality of spinning boxes arranged along a first direction, an inspection passage being provided on one side of the plurality of spinning boxes, and an inspection robot being capable of moving in the inspection passage to sequentially detect working states of the plurality of spinning boxes; the apparatus including:
  a first acquiring unit configured to acquire first image information of the inspection passage in a case where the inspection robot inspects a first position corresponding to a first spinning box in the inspection passage, wherein the first spinning box is one of the plurality of spinning boxes, and the first image information is photographed by the inspection robot;
  a first determining unit configured to determine a second spinning box from the plurality of spinning boxes in a case where the first image information includes a first detection object, wherein the second spinning box has a detection sequence behind the first spinning box;
  a second acquiring unit configured to acquire second image information of the inspection passage in a case where the inspection robot inspects a second position corresponding to the second spinning box in the inspection passage, wherein the second image information is photographed by the inspection robot and is an image including a position of the first detection object in the first image information; and
  a second determining unit configured to determine state information of the first detection object based on the first image information and the second image information.

In a third aspect, provided is an electronic device, including:
  at least one processor; and
  a memory connected in communication with the at least one processor;
  wherein the memory stores an instruction executable by the at least one processor, and the instruction, when executed by the at least one processor, enables the at least one processor to execute the method of any of embodiments of the present disclosure.

In a fourth aspect, provided is a non-transitory computer-readable storage medium storing a computer instruction thereon, wherein the computer instruction is used to cause a computer to execute the method of any of embodiments of the present disclosure.

The spinning workshop inspection method and apparatus, the electronic device and the storage medium according to the present disclosure can acquire first image information of the inspection passage in a case where the inspection robot inspects a first position corresponding to a first spinning box in the inspection passage, wherein the first spinning box is one of the plurality of spinning boxes, and the first image information is photographed by the inspection robot; determine a second spinning box from the plurality of spinning boxes in a case where the first image information includes a first detection object, wherein the second spinning box has a detection sequence behind the first spinning box; acquire second image information of the inspection passage in a case where the inspection robot inspects a second position corresponding to the second spinning box in the inspection passage, wherein the second image information is photographed by the inspection robot and the second image information is an image including a position of the first detection object in the first image information; and determine state information of the first detection object based on the first image information and the second image information. The inspection robot can detect the state information of workers in the inspection passage in the inspection process, so that the workers possibly having safety problems can be found in time, the probability of safety problems occurring in the operations of the workers is favorably reduced, and potential safety hazards are reduced.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

DETAILED DESCRIPTION

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

In order to facilitate understanding of the spinning workshop inspection method according to an embodiment of the present disclosure, the related technologies of the embodiment of the present disclosure will be explained below, and the following related technologies, serving as alternatives, may be arbitrarily combined with the technical solutions of the embodiment of the present disclosure, all of which fall within the protection scope of the protection of the present disclosure.

In the related art, the temperature within the spinning workshop is typically high, making it easy for workers to experience heat exhaustion and fainting due to high temperature during their operations, thereby posing safety hazards.

In order to solve at least one of the problems, the embodiments of the present disclosure provides a spinning workshop inspection method and apparatus, an electronic device, and a storage medium, in which an inspection robot can detect state information of workers in an inspection passage during an inspection process, so that the workers who may have safety problems can be timely found, thereby advantageously lowering the probability of safety problems occurring in worker operations and reducing potential safety hazards.

The embodiments of the present disclosure will be described below with reference to the accompanying drawings.

Figure 1:
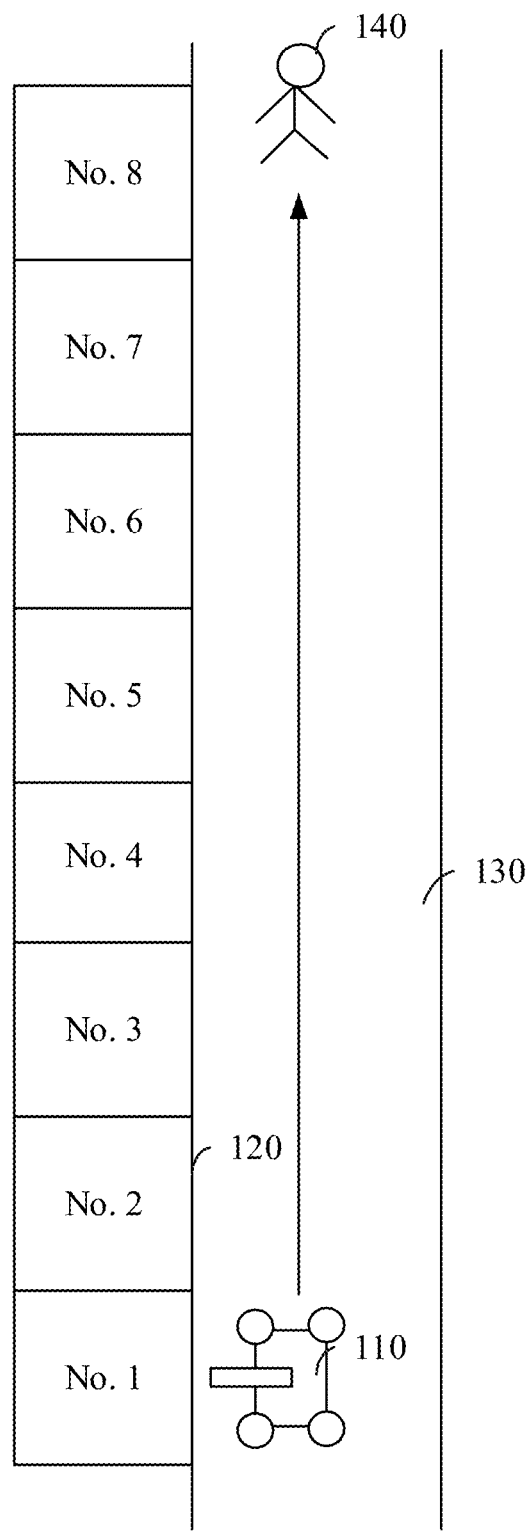
FIG. 1 is a schematic view of an application scenario of a spinning workshop inspection method according to an embodiment of the disclosure.
Figure 2:
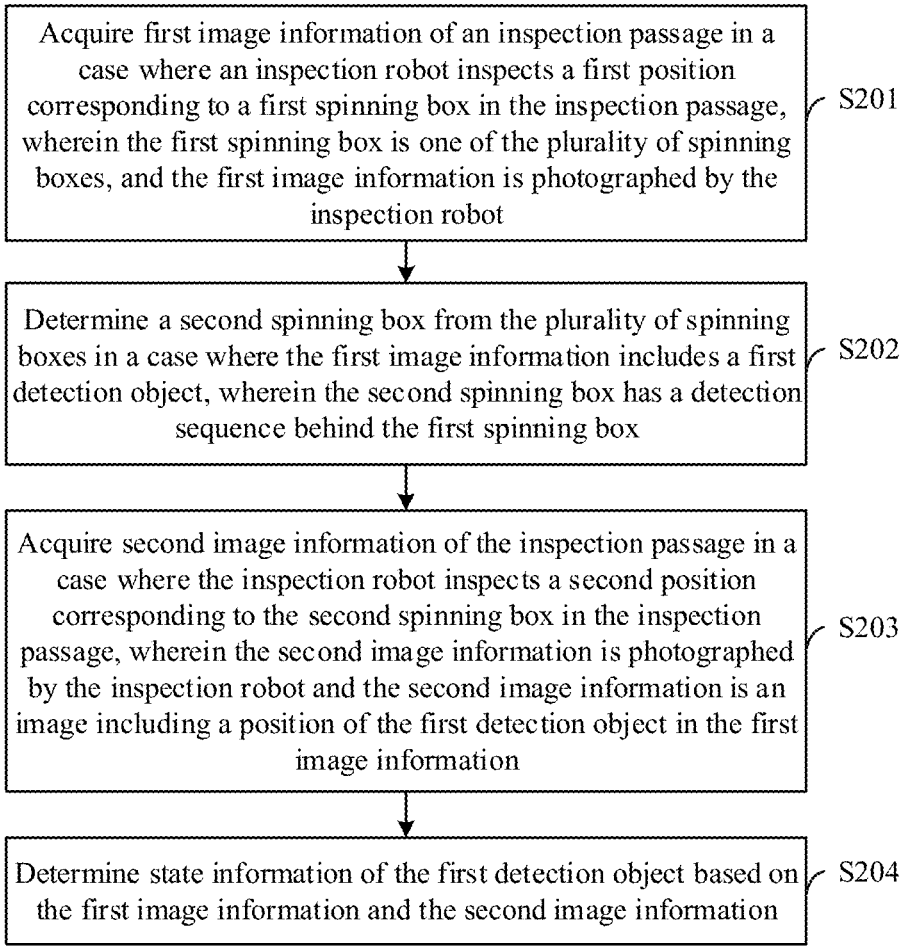
FIG. 2 is a flowchart of the spinning workshop inspection method according to an embodiment of the disclosure.

FIG. 1 is a schematic view of an application scenario of a spinning workshop inspection method according to an embodiment of the disclosure; FIG. 2 is a flowchart of the spinning workshop inspection method according to an embodiment of the disclosure.

Referring to FIGS. 1 and 2, an embodiment of the present disclosure provides a spinning workshop inspection method 200, where the spinning workshop includes a plurality of spinning boxes 120 arranged along a first direction, an inspection passage 130 is provided on one side of the plurality of spinning boxes 120, and an inspection robot 110 can move in the inspection passage 110 to sequentially detect working states of the plurality of spinning boxes 120; the method 200 includes the following steps S201 to S204:

Step S201, acquiring first image information of the inspection passage in a case where the inspection robot inspects a first position corresponding to a first spinning box in the inspection passage, wherein the first spinning box is one of the plurality of spinning boxes, and the first image information is photographed by the inspection robot;

Step S202, determining a second spinning box from the plurality of spinning boxes in a case where the first image information includes a first detection object, wherein the second spinning box has a detection sequence behind the first spinning box;

Step S203, acquiring second image information of the inspection passage in a case where the inspection robot inspects a second position corresponding to the second spinning box in the inspection passage, wherein the second image information is photographed by the inspection robot and the second image information is an image including a position of the first detection object in the first image information; and Step S204, determining state information of the first detection object based on the first image information and the second image information.

It can be understood that the spinning box 120 may be a production facility of fiber filaments, and that there may be a plurality of spinning boxes 120 in a spinning workshop. FIG. 1 only shows the spinning boxes 120 arranged in a column. In other embodiments, the plurality of spinning boxes 120 may be arranged in an array in a spinning workshop. One side of a column of spinning boxes can be provided with an inspection passage 130, and workers can walk in the inspection passage.

The inspection robot is a robot capable of realizing inspection in the related art, a bottom of which an Automated Guided Vehicle (AGV) can be arranged, to realize free walking of the inspection robot in a spinning workshop. The inspection robot is provided with a mechanical arm which can realize multi-degree-of-freedom movement and which can carry a camera to detect the working state of the spinning box, such as an occurrence of fault. The inspection of the working state can include phenomena of the presence of floating filaments, broken filaments or foreign matters on a filament path, whether a spinneret plate needs scraping, and any abnormalities with the guide hooks and oil nozzles, for example.

It can be understood that the first direction is an arrow direction in FIG. 1. The inspection robot can inspect spinning boxes 120 Nos. 1 to 8 in turn in the inspection passage 130 along the first direction. Taking spinning box No. 1 as an example, when moving to a position corresponding to the No. 1 spinning box (for example, right in front of the spinning box), the inspection robot can inspect the working state of the No. 1 spinning box.

The method 200 is applied to a management system of an inspection robot or a spinning workshop, such as a server, and the inspection robot can be in communication connection with the server. The inspection robot can be provided with a camera for photographing the surrounding environment. Specifically, in step S201, when the inspection robot reaches the first position of the first spinning box, the first image information in the inspection passage 130 may be photographed by the camera. The first spinning box may be one of the plurality of spinning boxes, and for example, it may be the first spinning box in the column of spinning boxes, such as spinning box No. 1 in FIG. 1. The first position may be an inspection position of the first spinning box, for example, a position right in front thereof, and when located at the position, the inspection robot 110 may inspect the working state of the first spinning box.

In step S202, the first image information including the first detection object 140 may be understood as that the first image information including a human body (i.e., a worker). For example, whether the first image information includes the human body may be determined by image recognition. If the first image information includes the human body, the worker may be considered as a first detection object, and then a second spinning box different from the first spinning box may be determined from the plurality of spinning boxes 120. The second spinning box may be determined by various methods. For example, a serial number of the second spinning box, for example, the spinning box No. 5, may be calculated according to a preset photographing time interval, an average inspection time of each spinning box and a serial number of the first spinning box. It will be appreciated that the order of inspection of the second spinning box is after the order of the first spinning box.

In step S203, after the inspection robot reaches the second spinning box, the second image information of the inspection passage may be photographed by the camera. It can be understood that, given that the first detection object in the first image information is located near the spinning box No. 8, the second image information is also an image photographed near the spinning box No. 8. In other words, the second image information is an image including a position of the first detection object in the first image information.

It can be understood that each spinning box is correspondingly provided with a serial number. The serial number can be arranged on the spinning box, or over a corresponding top or by a side space of the spinning box. The first serial number of the spinning box closest to the first detection object in the first image information can be determined by the image recognition. In the process of photographing the second image information, a position of the first detection object can be advantageously tracked by searching for the spinning box with the first serial number and taking a photograph near the spinning box, thereby further determining the state information of the first detection object.

In step S204, by analyzing the first image information and the second image information, the state information of the first detection object, which reflects a safety or danger state of the first detection object, may be determined.

It can be understood that given that the second image information also includes the first detection object and a motion of the first detection object in the first image information and the second image information does not change, it can be considered that the first detection object may be in a dangerous state of heatstroke and faint. An alarm message can be sent to notify a manager to check.

Alternatively, given that the second image information does not include the first detection object, it can represent a position before the first detection object leaves, and therefore, the first detection object is in a conscious and healthy state, that is, the first detection object is considered to be in a safe state.

In this embodiment, the inspection robot 110 photographs the image in the inspection passage during the inspection, determines the second spinning box when first image information includes the first detection object, photographs the second image information when the inspection robot inspects the second spinning box, and determines the state information of the first detection object through the first image information and the second image information, thereby inspecting the state information of the worker in the inspection passage, thereby finding the worker probably having the safety problem in time, advantageously reducing the probability of the safety problem that may appear in the operation of the worker and lowering the potential safety hazard.

In some embodiments, determining the second spinning box from the plurality of spinning boxes in the case where the first image information includes the first detection object in step S202 may include:

determining a target detection grade of the first detection object based on posture information of the first detection object in the first image information in the case where the first image information includes the first detection object; and determining the second spinning box based on the target detection grade.

It can be understood that the posture information of the first detection object may have a correspondence relation with the detection grade. For example, the posture information may be classified into a standing posture, a sitting posture, a lying posture, the standing posture may correspond to a lower detection grade, the sitting posture may correspond to a medium detection grade, and the lying posture may correspond to a higher detection grade. The higher the detection grade is, the higher the probability that the first detection object is in a dangerous state is. In this regard, the photographing time interval between the first image information and the second image information (or a serial number difference between the first spinning box and the second spinning box) can be set to be smaller, so that the safety problem of workers can be found as soon as possible.

In the case where the first image information includes the first detection object, the corresponding detection grade, namely the target detection grade of the first detection object, can be found according to the gesture information of the first detection object, then the second spinning box which is inspected when the second image information is photographed can be determined according to the target detection grade, and the photographing time of the second image information can further be determined, so that the situation that the treatment time of workers in a dangerous state is delayed due to the fact that the second image information is photographed later may be avoided, and the safety problem of the workers can be found as early as possible.

In some embodiments, determining the target detection grade of the first detection object based on the posture information of the first detection object in the first image information includes:

predicting the first image information by using a human body posture prediction model to obtain the posture information of the first detection object and a confidence coefficient of the posture information;

determining a detection score of the first detection object based on the posture information and the confidence coefficient of the posture information; and determining the target detection grade based on the detection score and a correspondence relation between the detection score and the detection grade.

The human body posture prediction model may be a model such as a neural network in the related art, which may predict position coordinates of a key point of a human body through image information and then predict a human body posture, i.e., posture information.

The posture information of the first detection object in the first image information and the confidence coefficient of the posture information can be determined through the human body posture prediction model.

In this embodiment, a basic score may be preset for each type of posture information. For example, a standing posture, a sitting posture, and a lying posture included in the posture information may correspond to different basic scores of 1, 5, and 10, respectively. The detection score of the first detection object can be obtained by performing exponentiation by taking the basic score as a base number and the confidence coefficient of the corresponding posture information as an index.

The detection score and the detection grade can have a correspondence relation. The higher the score is, the higher the probability that the current first detection object is in danger is indicated, and the higher the detection grade is, the higher attention needs to be paid to the first detection object. By determining the detection score, the target detection grade can be determined more accurately.

Of course, in this embodiment, the posture information is simply classified, and in other embodiments, the posture information may be classified in more detail.

In some embodiments, determining the second spinning box based on the target detection grade may include: determining a target detection time interval corresponding to the target detection grade based on the target detection grade; and determining the second spinning box based on the target detection time interval.

The detection grade can be embodied in the detection time interval. The corresponding target detection time interval can be determined through the target detection grade by presetting the correspondence relation between the detection grade and the detection time interval. It should be understood that the higher the detection grade is, the higher the target time interval is, and the target time interval is a photographing time interval between the first image information and the second image information, thereby accurately and advantageously determining the second spinning box.

In some embodiments, provided is a spinning workshop inspection method 300, including the following steps S301-S309:

Step S301, acquiring first image information of an inspection passage in a case where an inspection robot inspects a first position corresponding to a first spinning box in the inspection passage, wherein the first spinning box is one of the plurality of spinning boxes, and the first image information is photographed by the inspection robot;

Step S302, segmenting the first image information by using an image segmentation model to obtain a first segmentation result;

Step S303, determining a detection object of a target type in the first image information to be the first detection object in a case where the first segmentation result includes the detection object of the target type;

Step S304, determining the second spinning box from the plurality of spinning boxes in a case where the first image information includes the first detection object, wherein the second spinning box has a detection sequence behind the first spinning box;

Step S305, acquiring second image information of the inspection passage in a case where the inspection robot inspects a second position corresponding to the second spinning box in the inspection passage, wherein the second image information is photographed by the inspection robot and is an image including a position of the first detection object in the first image information;

Step S306, segmenting the second image information by using the image segmentation model to obtain a second segmentation result;

Step S307, determining the detection object of the target type in the second image information to be the second detection object in a case where the second segmentation result includes the detection object of the target type;

Step S308, comparing the first detection object and the second detection object to obtain a comparison result, wherein the comparison result is used for indicating whether the second detection object and the first detection object belong to the same object; and Step S309, determining the state information of the first detection object based on the comparison result.

Step S301, step S304, and step S305 correspond to step S201 to step S203, respectively. Reference can be made to the above embodiment for details, description of which will be omitted herein.

Steps S307 to S309 are further refinements of step S204 as described above, i.e., step S204 may specifically include steps S307 to S309.

In step S302, the first image information may be segmented by the image segmentation model. The image segmentation model may divide an image by region tags. For example, a Segment Anything model may be adopted to finely segment the image, so as to obtain each region in the image and a type tag corresponding to each region.

By segmenting the first image information through the image segmentation model, a plurality of regional images in the first image information and corresponding types of the regional images, serving as the first segmentation result, can be obtained.

In step S303, the detection object of the target type may be searched from the first segmentation result. The target type may be a human body. If there is a regional image having the type tag of human body in the first segmentation result, a worker (i.e., the detection object) corresponding to the regional image may be regarded as the first detection object.

The segmentation method in step S306 is similar to that in step S302. Reference can be made to step S302 for details. After the second image information is subjected to image segmentation, the second segmentation result is obtained.

The determination method in step S307 is similar to that in step S303. Reference can be made to step S303 for details. If there is a regional image having the type tag of human body in the second segmentation result, a worker corresponding to the regional image may be regarded as the second detection object.

In step S308, the first detection object and the second detection object may be compared to obtain the comparison result, which is used to determine whether the two detection objects are the same object, that is, to determine whether the two detection objects are the same worker.

In step S309, the state information of the first detection object may be determined according to the comparison result of step S308.

In this embodiment, by segmenting the first image information and the second image information by the image segmentation model, it is possible to accurately determine whether the image includes a worker or not, thereby facilitating the subsequent comparison of the first detection object with the second accurate object.

In some embodiments, comparing the first detection object with the second detection object to obtain the comparison result in step S308 may include:
  acquiring first identification information of the first detection object;
  acquiring second identification information of the second detection object; and
  comparing the first identification information and the second identification information to obtain the comparison result.

The first identification information may be a human face, an employee number on the clothing of an employee, or the like, and it is possible to judge whether the first detection object and the second detection object are the same detection object by comparing the first identification information.

In some embodiments, the first identification information includes a first face image of the first detection object and the second identification information includes a second face image of the second detection object. The acquiring the first identification information of the first detection object in the method includes: determining the first face image to be the first identification information in a case where the first segmentation result includes the first face image having a type of human face;
  the acquiring the second identification information of the second detection object in the method includes: determining the second face image to be the second identification information in a case where the second segmentation result includes the second face image having the type of the human face.

It can be understood that, in addition to accurately identifying the region of the human body, the image segmentation model, for example the Segment Anything model, can also accurately segment the region of the human body, for example, to extract a face region.

Of course, the first segmentation result may also include a result undergoing multiple segmentations by using the image segmentation model. For example, the first image information is segmented first to extract a regional image of the first detection object, then the regional image is secondarily segmented by using the image segmentation model to obtain a first face image of a human body having a type of human face, and the first face image is regarded as the first identification information.

Similarly, the extraction method of the second identification information is similar to that of the first identification information, which will not be described herein.

By using the face image as the identification information, it is possible to accurately judge whether the first detection object and the second detection object are the same person.

In other embodiments, the acquiring the first identification information of the first detection object may further include:
  determining a first photographing time of the first image information and target position information of the first detection object in a case where the first segmentation result does not include the first face image having the type of the human face, wherein the target position information is serial number information of a third spinning box closest to the first detection object, the target position information is obtained based on the first segmentation result, and the third spinning box is one of the plurality of spinning boxes;
  determining a first camera device capable of photographing the target position information in the spinning workshop based on the target position information;
  acquiring a first auxiliary image photographed by the first camera device at the first photographing time; and
  determining the first face image based on the first auxiliary image.

In this embodiment, if the first segmentation result does not include the human face, that is, the first image information cannot extract the first face image of the first detection object, the serial number information of the spinning box at a position closest to the first detection object may be found according to the first segmentation result. As shown in FIG. 1, the worker is near the spinning box No. 8, and the first image information may capture the serial number of the spinning box No. 8. A region of the spinning box and the serial number information in the region may be obtained through the image segmentation, that is, the serial number information of the spinning box closest to the first detection object may be determined.

The serial number information can then be regarded as the position information of the first detection object, and the first camera device in the spinning workshop capable of photographing an image at the position can be invoked. The first camera device may be an image capturing device installed at a position such as a ceiling of the workshop.

An image frame (a first auxiliary image) corresponding to the first photographing time for photographing the first image information can be found according to a video captured by the first camera device, and the first face image is extracted according to the image frame.

The first face image corresponding to the first detection object can be obtained from different angles through the first camera device, thereby facilitating the accurate extraction of the first face image of the first detection object.

It can be understood that, in a case where the second segmentation result of the second image information does not include the second face image, the second face image photographed from different angles can also be found by using the camera device in the spinning workshop through the above method.

Figure 3:
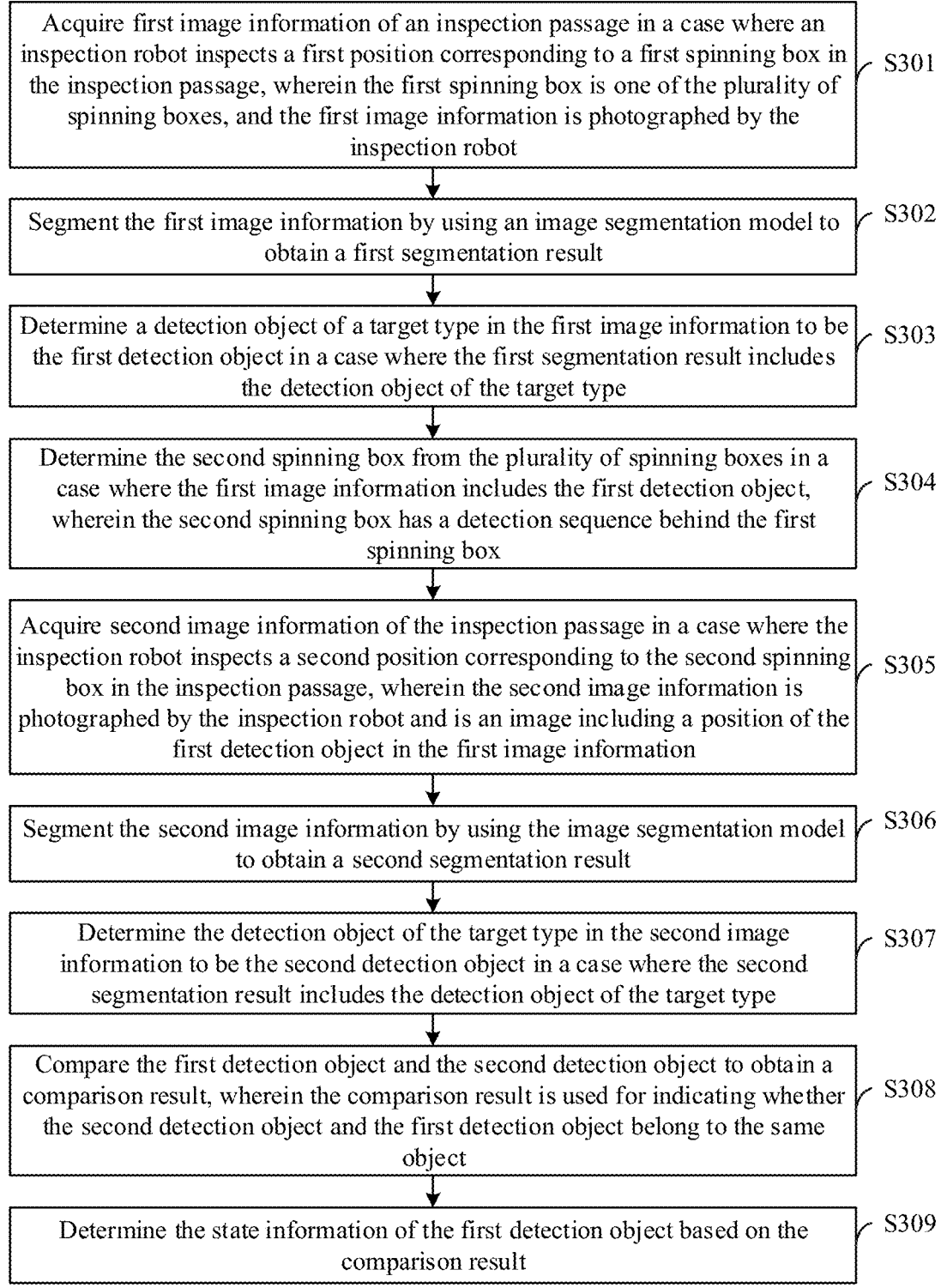
FIG. 3 is a flowchart of the spinning workshop inspection method according to another embodiment of the disclosure.

FIG. 3 is a flowchart of the spinning workshop inspection method according to another embodiment of the disclosure; referring to FIG. 3, in some embodiments, the step S308 of comparing the first detection object and the second detection object to obtain the comparison result further includes:

in a case where the first face image of the first detection object is not able to be acquired or the second face image of the second detection object is not able to be acquired, acquiring a first character on a garment of the first detection object and a second character on a garment of the second detection object;

acquiring the first identification information of the first detection object including: determining the first character to be the first identification information; and acquiring the second identification information of the second detection object including: determining the second character to be the second identification information.

It can be understood that each worker may have his/her name or staff number on his/her work garment. In the case where the first face image or the second face image cannot be acquired by the above method, an identity of the worker may be determined by acquiring characters (for example, a name or a staff number) on the garment of the worker as the identification information.

In some embodiments, acquiring the first character on the garment of the first detection object may include:

determining a first region in the first image information based on the first segmentation result, wherein the first region is a region where the first detection object is located in the first image information; and determining the first character based on a first local image in a case where the first segmentation result indicates that the first region includes the first local image having a type of a character.

In this embodiment, the first segmentation result may include the first region where the first detection object is located, and the first region may be accurately extracted according to the target type.

Subsequently, the first region may undergo a secondary image segmentation, and when the first region includes a type tag having a type of a character, the first local image corresponding to the character may be extracted, and a first character corresponding thereto may be recognized by means of character recognition, for example.

The identity information of the first detection object can be also accurately judged by the first character.

In some embodiments, acquiring the first character on the garment of the first detection object may further include:

determining a first photographing time of the first image information and target position information of the first detection object in a case where the first segmentation result indicates that the first region does not include the first local image having the type of the character, wherein the target position information is serial number information of a third spinning box closest to the first detection object, the target position information is obtained based on the first segmentation result, and the third spinning box is one of the plurality of spinning boxes;

determining a first camera device capable of photographing the target position information in the spinning workshop based on the target position information;

acquiring a first auxiliary image photographed by the first camera device at the first photographing time; and determining the first character based on the first auxiliary image.

In this embodiment, if the first character cannot be determined by the first image information, the serial number information of the spinning box at a position closest to the first detection object may be found according to the first segmentation result. As shown in FIG. 1, the worker is near the spinning box No. 8, and the first image information may capture the serial number of the spinning box No. 8. A region of the spinning box and the serial number information in the region may be obtained through the image segmentation, that is, the serial number information of the spinning box closest to the first detection object may be determined.

The serial number information can then be regarded as the position information of the first detection object, and the first camera device in the spinning workshop capable of photographing an image at the position can be invoked. The first camera device may be an image capturing device installed at a position such as a ceiling of the workshop.

An image frame (a first auxiliary image) corresponding to the first photographing time for photographing the first image information can be found according to a video captured by the first camera device, and the first character is extracted according to the image frame. Specifically, the first character can be recognized by utilizing the image segmentation and image recognition technologies.

The first character corresponding to the first detection object can be obtained from different angles through the first camera device, thereby facilitating the determination of the identity information of the first detection object.

Similarly, the second character corresponding to the second detection object may be determined in a similar way to the above embodiments.

On the basis of the above embodiment, the step S309 of determining the state information of the first detection object based on the comparison result may include:

in a case where the comparison result indicates that the second detection object and the first detection object belong to the same object, determining a first region where the first detection object is located in the first image information and a second region where the second detection object is located in the second image information;

determining a similarity between the first region and the second region; and determining the state information of the first detection object based on the similarity.

The first region and the second region can be both local regions having the type of human body extracted from the segmentation result.

It can be understood that, in the case where the first detection object and the second detection object belong to the same object, it is possible to determine whether the position and the posture of the worker are changed by calculating the similarity between the first region and the second region, such that the state information of the first detection object may be obtained.

In some embodiments, determining the state information of the first detection object based on the similarity may include:

determining the state information of the first detection object to be a dangerous state and sending first alarm information in a case where the similarity exceeds a similarity threshold; and determining that the state information of the first detection object is in a safe state in a case where the similarity does not exceed the similarity threshold.

If the similarity exceeds the similarity threshold, the probability that the position and the posture of the first detection object are not changed might be high and it can be determined that the first detection object is possibly in the dangerous state. At the moment, the first alarm information can be sent to a manager to inform him/her to check the worker, such that the dangerous condition of the worker can be found in time.

Otherwise, if the similarity is lower than or equal to the threshold, the probability that the position and the posture of the first detection object are changed might be high and it can be determined that the first detection object is naturally in the safe state.

In some embodiments, determining the state information of the first detection object to be the dangerous state in the case where the similarity exceeds the similarity threshold, includes:

determining first object information of the first detection object in the case where the similarity exceeds the similarity threshold;

determining a wearable device worn by the first detection object based on the first object information;

acquiring current health data from the wearable device, wherein the current health data is used for representing a current vital sign index of the first detection object; and determining the state information of the first detection object to be the dangerous state in a case where the current health data exceeds a preset health range.

It could be understood that the worker can wear a wearable device, such as a smart bracelet, while working in the spinning workshop. The wearable device can monitor health data such as worker's blood pressure, body temperature and heartbeat.

In this embodiment, when the similarity exceeds the similarity threshold, the first object information may also be determined, where the first object information may be an identity of the first detection object (for example, his/her staff number or name). For the acquisition method of the first object information, reference can be made to the acquisition method of the first identification information. When the first object information is a name, the first face image in the first identification information may be acquired first, and then the first object information may be obtained according to correspondence data between staff's face image and name as recorded.

When the first identification information is a first character and the first character is a staff number, the first identification information as acquired may be regarded as the first object information.

Then, the wearable device corresponding to the first detection object can be determined through the first object information, the current health data is obtained from the wearable device. If the current health data exceeds the preset health range, for example, any one of blood pressure, body temperature, heartbeat exceeds the preset health range, the first detection object will be considered to be in a dangerous state. If all the health data are within the preset health range, the first detection object will be considered to be in a safe state.

In this embodiment, the current vital sign state of the first detection subject can be further determined through the wearable device, thereby facilitating the accuracy of determining the state information.

In some embodiments, determining the similarity between the first region and the second region may include:

obtaining a first position information set of key points of the first detection object in the first image information by using a human body posture prediction model;

obtaining a second position information set of the key points of the first detection object in the second image information by using the human body posture prediction model; and determining the similarity based on the first position information set and the second position information set.

In this embodiment, the similarity between the first region and the second region may be represented by the similarity between the posture information of the first detection object and the posture information of the second detection object in the first image information.

Specifically, the first position information set of the key points in the first detection object can be obtained through the human body posture prediction model. The key points may be key points of a human body, and may include, for example, key parts such as a nose, a left eye, a right eye, a left ear, a right ear, a left shoulder, a right shoulder, a left elbow, a right elbow, a left wrist, a right wrist, a left crotch, a right crotch, a left knee, a right knee, a left ankle and a right ankle.

Similarly, the human body gesture prediction model may be used to predict the positions of the key points of the second detection object in the second image information, so as to obtain the second position information set.

Then a comparison can be performed based on the position information set. For example, the human body posture is reconstructed by using the of position information set and then similarity compassion between two postures is performed to obtain the similarity.

Whether the posture of the first detection object is changed or not can be accurately judged through the key points of the human body.

In some embodiments, determining the similarity between the first region and the second region may include: adjusting a size of the first region such that a size of a minimum enclosing rectangular frame of the adjusted first region is consistent with that of a minimum enclosing rectangular frame of the second region; and determining a similarity between a profile of the second region and a profile of the adjusted first region.

In this embodiment, by photographing the first region of the human body in the first image information and the second region of the human body in the second image information and adjusting the sizes of the first region and the second region through scaling processing, the sizes of the minimum enclosing rectangular frames of the first region and the second region can be consistent, and then the similarity comparison between the profiles is performed to serve as the similarity between the first region and the second region.

It can be understood that due to the slight change of the photographing angle, the sizes of the human body in the first image information and in the second image information can be correspondingly enlarged or reduced. The sizes of the human body in the first image information and in the second image information can have a relatively consistent size proportion through size adjustment, facilitating the accuracy of the result of the state information.

In addition, depending on the different photographing angles, even if the position of the worker remains unchanged, the human bodies in the first and second image information may not be 100% similar. At this time, a degree of change in camera angles may be determined according to a range of the photographing time interval, and then the similarity threshold may be determined. For example, if the degree of change may be larger, the similarity threshold may be set to be lowered, for example, by about 70%, so as to obtain a relatively reasonable determination result on the state information.

In some embodiments, in step S309, determining the state information of the first detection object based on the comparison result may further include: determining the state information of the first detection object to be the safe state in a case where the comparison result indicates that the second detection object and the first detection object do not belong to the same object.

Given that the first detection object and the second detection object do not belong to the same object, it can be determined that the first detection object leaves its original position in the inspection process of the inspection robot, indicating that the first detection object is in an active state, and thus it is determined the first detection object to be in the safe state and not in a heatstroke and fainting state.

In addition, in a case where it is determined that the state information or first image information of the first detection object does not include the human body, the inspection method can be executed again according to a preset restart time, for example, ten minutes, so that the inspection passage can be continuously detected in the inspection process and the working personnel in the dangerous state can be timely found.

In some embodiments, in step S204, determining the state information of the first detection object based on the first image information and the second image information further includes: determining the state information of the first detection object to be the safe state in a case where the second segmentation result does not include the detection object of the target type.

Given that the second image information does not include the human body, it can be represented that the first detection object has left its original position in the inspection process of the inspection robot, and the first detection object can be determined to be in the safe state.

Figure 4:
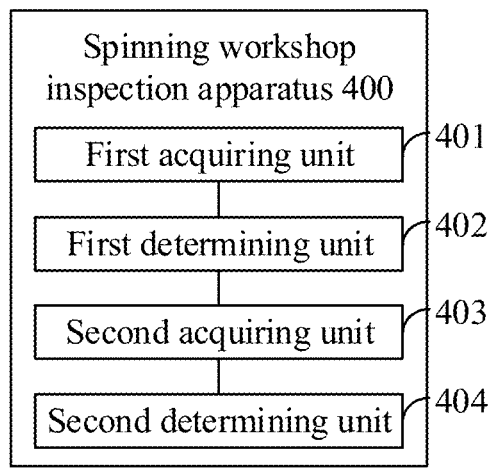
FIG. 4 is a block diagram of a spinning workshop inspection apparatus according to an embodiment of the disclosure.

FIG. 4 is a block diagram of a spinning workshop inspection apparatus according to an embodiment of the disclosure. Referring to FIG. 4, there is provided a spinning workshop inspection apparatus 400 in the embodiment of the present disclosure, where the spinning workshop includes a plurality of spinning boxes arranged along a first direction, an inspection passage is provided on one side of the plurality of spinning boxes, and an inspection robot can move in the inspection passage to sequentially detect working states of the plurality of spinning boxes; the apparatus 400 includes:
- a first acquiring unit 401 configured to acquire first image information of the inspection passage in a case where the inspection robot inspects a first position corresponding to a first spinning box in the inspection passage, wherein the first spinning box is one of the plurality of spinning boxes, and the first image information is photographed by the inspection robot;
- a first determining unit 402 configured to determine a second spinning box from the plurality of spinning boxes in a case where the first image information includes a first detection object, wherein the second spinning box has a detection sequence behind the first spinning box;
- a second acquiring unit 403 configured to acquire second image information of the inspection passage in a case where the inspection robot inspects a second position corresponding to the second spinning box in the inspection passage, wherein the second image information is photographed by the inspection robot and is an image including a position of the first detection object in the first image information; and
- a second determining unit 404 configured to determine state information of the first detection object based on the first image information and the second image information.

In some embodiments, the first determining unit 402 is further configured to: determine a target detection grade of the first detection object based on posture information of the first detection object in the first image information in the case where the first image information includes the first detection object; and determine the second spinning box based on the target detection grade.

In some embodiments, the first determining unit 402 is further configured to: predict the first image information by using a human body posture prediction model to obtain posture information of the first detection object and a confidence coefficient of the posture information; determine a detection score of the first detection object based on the posture information and the confidence coefficient of the posture information; and determine the target detection grade based on the detection score and a correspondence relation between the detection score and the detection grade.

In some embodiments, the first determining unit 402 is further configured to: determine a target detection time interval corresponding to the target detection grade based on the target detection grade; and determine the second spinning box based on the target detection time interval.

In some embodiments, the apparatus 400 further includes:
- a first segmentation unit configured to segment the first image information by using an image segmentation model to obtain a first segmentation result;
- a third determining unit configured to determine a detection object of a target type in the first image information to be the first detection object in a case where the first segmentation result includes the detection object of the target type;
- a second segmentation unit configured to segment the second image information by using the image segmentation model to obtain a second segmentation result; and
- the second determining unit 404 is further configured to: determine a detection object of a target type in the second image information to be a second detection object in a case where the second segmentation result includes the detection object of the target type; compare the first detection object and the second detection object to obtain a comparison result, wherein the comparison result is used for indicating whether the second detection object and the first detection object belong to the same object; and determine the state information of the first detection object based on the comparison result.

In some embodiments, the second determining unit 404 is further configured to: acquire first identification information of the first detection object; acquire second identification information of the second detection object; and compare the first identification information with the second identification information to obtain the comparison result.

In some embodiments, the first identification information includes a first face image of the first detection object, and the second identification information includes a second face image of the second detection object; the first determining unit 402 is further configured to: determine the first face image to be the first identification information in a case where the first segmentation result includes the first face image having a type of the human face; and the first determining unit 402 is further configured to: determine the second face image to be the second identification information in a case where the second segmentation result includes the second face image having a type of the human face.

In some embodiments, the first determining unit 402 is further configured to: determine a first photographing time of the first image information and target position information of the first detection object in a case where the first segmentation result does not include the first face image having the type of the human face, wherein the target position information is serial number information of a third spinning box closest to the first detection object, the target position information is obtained based on the first segmentation result, and the third spinning box is one of the plurality of spinning boxes; determine a first camera device capable of photographing the target position information in the spinning workshop based on the target position information; acquire a first auxiliary image photographed by the first camera device at the first photographing time; and determine the first face image based on the first auxiliary image.

In some embodiments, the second determining unit 404 is further configured to: in a case where the first face image of the first detection object is not able to be acquired or the second face image of the second detection object is not able to be acquired, acquire a first character on a garment of the first detection object and a second character on a garment of the second detection object; determine the first character to be the first identification information; and determine the second character to be the second identification information.

In some embodiments, the second determining unit 404 is further configured to: determine a first region in the first image information based on the first segmentation result, wherein the first region is a region where the first detection object is located in the first image information; and determine the first character based on a first local image in a case where the first segmentation result indicates that the first region includes the first local image having a type of a character.

In some embodiments, the second determining unit 404 is further configured to: determine a first photographing time of the first image information and target position information of the first detection object in a case where the first segmentation result indicates that the first region does not include the first local image having the type of the character, wherein the target position information is serial number information of the third spinning box closest to the first detection object, the target position information is obtained based on the first segmentation result, and the third spinning box is one of the plurality of spinning boxes; determine a first camera device capable of photographing the target position information in the spinning workshop based on the target position information; acquire a first auxiliary image photographed by the first camera device at the first photographing time; and determine the first character based on the first auxiliary image.

In some embodiments, the second determining unit 404 is further configured to: in a case where the comparison result indicates that the second detection object and the first detection object belong to the same object, determine a first region where the first detection object is located in the first image information and a second region where the second detection object is located in the second image information; determine a similarity between the first region and the second region; and determine the state information of the first detection object based on the similarity.

In some embodiments, the second determining unit 404 is further configured to: determine the state information of the first detection object to be a dangerous state and send first alarm information in a case where the similarity exceeds a similarity threshold; and determine that the state information of the first detection object is in a safe state in a case where the similarity does not exceed the similarity threshold.

In some embodiments, the second determining unit 404 is further configured to: determine first object information of the first detection object in the case where the similarity exceeds the similarity threshold; determine a wearable device worn by the first detection object based on the first object information; acquire current health data from the wearable device, wherein the current health data is used for representing a current vital sign index of the first detection object; and determine the state information of the first detection object to be the dangerous state in a case where the current health data exceeds a preset health range.

In some embodiments, the second determining unit 404 is further configured to: obtain a first position information set of key points of the first detection object in the first image information by using a human body posture prediction model; obtain a second position information set of the key points of the first detection object in the second image information by using the human body posture prediction model; and determine the similarity based on the first position information set and the second position information set.

In some embodiments, the second determining unit 404 is further configured to: adjust a size of the first region such that a size of a minimum enclosing rectangular frame of the adjusted first region is consistent with that of a minimum enclosing rectangular frame of the second region; and determine a similarity between a profile of the second region and a profile of the adjusted first region.

In some embodiments, the second determining unit 404 is further configured to: determine the state information of the first detection object to be in a safe state in a case where the comparison result indicates that the second detection object and the first detection object do not belong to the same object.

In some embodiments, the second determining unit 404 is further configured to: determine the state information of the first detection object to be the safe state in a case where the second segmentation result does not include the detection object of the target type.

For a description of specific functions and examples of each module and each sub-module of the apparatus in the embodiments of the present disclosure, reference may be made to the related description of the corresponding steps in the foregoing method embodiments, and details thereof are not repeated herein.

An embodiment of the present disclosure further provides an electronic device, including: at least one processor; and a memory connected in communication with the at least one processor, wherein the memory stores an instruction executable by the at least one processor, and the instruction, when executed by the at least one processor, enables the at least one processor to execute the method of any one of the above.

An embodiment of the present disclosure further provides a non-transitory computer-readable storage medium storing a computer instruction thereon, and the computer instruction is used to cause a computer to execute any of the methods described above.

Figure 5:
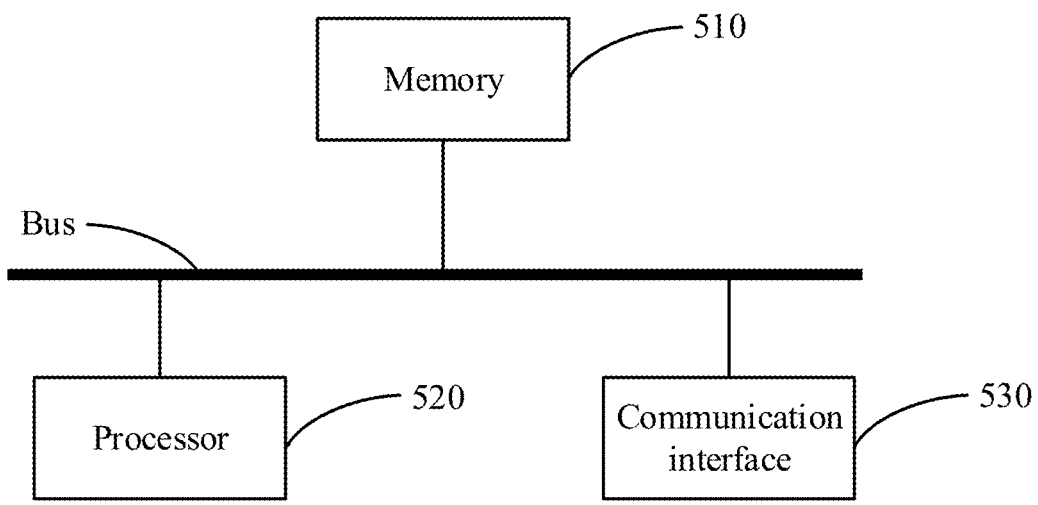
FIG. 5 is a block diagram of an electronic device for implementing the spinning workshop inspection method according to an embodiment of the disclosure.

FIG. 5 is a structural block diagram of an electronic device according to an embodiment of the present disclosure. As shown in FIG. 5, the electronic device includes: a memory 510 and a processor 520, and the memory 510 stores a computer program that can run on the processor 520.

There may be one or more memories 510 and processors 520. The memory 510 may store one or more computer programs, and the one or more computer programs cause the electronic device to perform the method provided in the above method embodiment, when executed by the electronic device. The electronic device may also include: a communication interface 530 configured to communicate with an external device for data interactive transmission.

If the memory 510, the processor 520 and the communication interface 530 are implemented independently, the memory 510, the processor 520 and the communication interface 530 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the bus is represented by only one thick line in FIG. 5, but this thick line does not represent only one bus or only one type of bus.

Optionally, in a specific implementation, if the memory 510, the processor 520 and the communication interface 530 are integrated on one chip, the memory 510, the processor 520 and the communication interface 530 may communicate with each other through an internal interface.

It should be understood that the above-mentioned processor may be a Central Processing Unit (CPU) or other general-purpose processor, a Digital Signal Processing (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification if there is no confliction with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A spinning workshop inspection method, a spinning workshop including a plurality of spinning boxes arranged along a first direction, an inspection passage being provided on one side of the plurality of spinning boxes, and an inspection robot being capable of moving in the inspection passage to sequentially detect working states of the plurality of spinning boxes; the method comprising:
- acquiring first image information of the inspection passage in a case where the inspection robot inspects a first position corresponding to a first spinning box in the inspection passage, wherein the first spinning box is one of the plurality of spinning boxes, and the first image information is photographed by the inspection robot;
- determining a second spinning box from the plurality of spinning boxes in a case where the first image information includes a first detection object of a target type, wherein the second spinning box is detected after the first spinning box in a detection sequence, and the target type is a human body;
- acquiring second image information of the inspection passage in a case where the inspection robot inspects a second position corresponding to the second spinning box in the inspection passage, wherein the second image information is photographed by the inspection robot and the second image information is an image including a position of the first detection object in the first image information; and
- determining state information of the first detection object based on the first image information and the second image information.

2. The method of claim 1, wherein the determining the second spinning box from the plurality of spinning boxes in the case where the first image information includes the first detection object comprises:
- determining a target detection grade of the first detection object based on posture information of the first detection object in the first image information in the case where the first image information includes the first detection object; and
- determining the second spinning box based on the target detection grade.

3. The method of claim 2, wherein the determining the target detection grade of the first detection object based on the posture information of the first detection object in the first image information comprises:
- predicting the first image information by using a human body posture prediction model to obtain the posture information of the first detection object and a confidence coefficient of the posture information;
- determining a detection score of the first detection object based on the posture information and the confidence coefficient of the posture information; and
- determining the target detection grade, based on the detection score and a correspondence relation between the detection score and a detection grade indicating a probability of the first detection object being in a dangerous state.

4. The method of claim 2, wherein the determining the second spinning box based on the target detection grade comprises:
- determining a target detection time interval corresponding to the target detection grade based on the target detection grade; and
- determining the second spinning box based on the target detection time interval.

5. The method of claim 1, further comprising:
- segmenting the first image information by using an image segmentation model to obtain a first segmentation result;
- determining a first object of the target type in the first image information to be the first detection object in a case where the first segmentation result includes the first object of the target type;
- segmenting the second image information by using the image segmentation model to obtain a second segmentation result; and
- the determining the state information of the first detection object based on the first image information and the second image information, comprising:
  - determining a second object of the target type in the second image information to be a second detection object in a case where the second segmentation result includes the second object of the target type;
  - comparing the first detection object and the second detection object to obtain a comparison result, wherein the comparison result is used for indicating whether the second detection object and the first detection object belong to the same object; and
  - determining the state information of the first detection object based on the comparison result.

6. The method of claim 5, wherein the comparing the first detection object and the second detection object to obtain the comparison result comprises:
- acquiring first identification information of the first detection object;
- acquiring second identification information of the second detection object; and
- comparing the first identification information and the second identification information to obtain the comparison result.

7. The method of claim 6, wherein the first identification information includes a first face image of the first detection object and the second identification information includes a second face image of the second detection object;
- the acquiring the first identification information of the first detection object, comprises:
  - determining the first face image to be the first identification information in a case where the first segmentation result includes the first face image having a type of human face; and
- the acquiring the second identification information of the second detection object, comprises:
  - determining the second face image to be the second identification information in a case where the second segmentation result includes the second face image having the type of human face.

8. The method of claim 7, wherein the acquiring the first identification information of the first detection object further comprises:
- determining a first photographing time of the first image information and target position information of the first detection object in a case where the first segmentation result does not include the first face image having the type of the human face, wherein the target position information is serial number information of a third spinning box closest to the first detection object, the target position information is obtained based on the first segmentation result, and the third spinning box is one of the plurality of spinning boxes;
- determining a first camera device capable of photographing the target position information in the spinning workshop based on the target position information;
- acquiring a first auxiliary image photographed by the first camera device at the first photographing time; and
- determining the first face image based on the first auxiliary image.

9. The method of claim 6, wherein the comparing the first detection object and the second detection object to obtain the comparison result further comprises:
in a case where the first face image of the first detection object is not able to be acquired or the second face image of the second detection object is not able to be acquired, acquiring a first character on a garment of the first detection object and a second character on a garment of the second detection object;
the acquiring the first identification information of the first detection object comprises: determining the first character to be the first identification information; and
the acquiring the second identification information of the second detection object comprises: determining the second character to be the second identification information.

10. The method of claim 9, wherein the acquiring the first character on the garment of the first detection object comprises:
determining a first region in the first image information based on the first segmentation result, wherein the first region is a region where the first detection object is located in the first image information; and
determining the first character based on a first local image in a case where the first segmentation result indicates that the first region includes the first local image having a type of a character.

11. The method of claim 10, wherein the acquiring the first character on the garment of the first detection object further comprises:
determining a first photographing time of the first image information and target position information of the first detection object in a case where the first segmentation result indicates that the first region does not include the first local image having the type of the character, wherein the target position information is serial number information of a third spinning box closest to the first detection object, the target position information is obtained based on the first segmentation result, and the third spinning box is one of the plurality of spinning boxes;
determining a first camera device capable of photographing the target position information in the spinning workshop based on the target position information;
acquiring a first auxiliary image photographed by the first camera device at the first photographing time; and
determining the first character based on the first auxiliary image.

12. The method of claim 5, wherein the determining the state information of the first detection object based on the comparison result comprises:
in a case where the comparison result indicates that the second detection object and the first detection object belong to the same object, determining a first region where the first detection object is located in the first image information and a second region where the second detection object is located in the second image information;
determining a similarity between the first region and the second region; and
determining the state information of the first detection object based on the similarity.

13. The method of claim 12, wherein the determining the state information of the first detection object based on the similarity comprises:
determining the state information of the first detection object to be a dangerous state and sending first alarm information in a case where the similarity exceeds a similarity threshold; and
determining that the state information of the first detection object is in a safe state in a case where the similarity does not exceed the similarity threshold.

14. The method of claim 13, wherein the determining the state information of the first detection object to be the dangerous state in the case where the similarity exceeds a similarity threshold comprises:
determining first object information of the first detection object in the case where the similarity exceeds the similarity threshold;
determining a wearable device worn by the first detection object based on the first object information;
acquiring current health data from the wearable device, wherein the current health data is used for representing a current vital sign index of the first detection object; and
determining the state information of the first detection object to be the dangerous state in a case where the current health data exceeds a preset health range.

15. The method of claim 13, wherein the determining the similarity between the first region and the second region comprises:
adjusting a size of the first region such that a size of a minimum enclosing rectangular frame of the adjusted first region is consistent with that of a minimum enclosing rectangular frame of the second region; and
determining a similarity between a profile of the second region and a profile of the adjusted first region.

16. The method of claim 12, wherein the determining the similarity between the first region and the second region comprises:
obtaining a first position information set of key points of the first detection object in the first image information by using a human body posture prediction model;
obtaining a second position information set of the key points of the second detection object in the second image information by using the human body posture prediction model; and
determining the similarity based on the first position information set and the second position information set.

17. The method of claim 5, wherein the determining the state information of the first detection object based on the comparison result further comprises:
determining the state information of the first detection object to be the safe state in a case where the comparison result indicates that the second detection object and the first detection object do not belong to the same object.

18. The method of claim 5, wherein the determining the state information of the first detection object based on the first image information and the second image information further comprises:
determining the state information of the first detection object to be the safe state in a case where the second segmentation result does not include the second object of the target type.

19. An electronic device, comprising:
at least one processor; and
a memory connected in communication with the at least one processor,
wherein the memory stores an instruction executable by the at least one processor, and the instruction, when executed by the at least one processor, enables the at least one processor to execute the method of claim 1.

20. A non-transitory computer-readable storage medium storing a computer instruction thereon, wherein the computer instruction is used to cause a computer to execute the method of claim 1.

* * * * *